United States Patent
Wu et al.

(10) Patent No.: US 12,238,718 B2
(45) Date of Patent: Feb. 25, 2025

(54) PROCESSING METHOD AND DEVICE

(71) Applicant: VIVO MOBILE COMMUNICATION CO., LTD., Guangdong (CN)

(72) Inventors: Yumin Wu, Guangdong (CN); Xiaohang Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 489 days.

(21) Appl. No.: 17/541,747

(22) Filed: Dec. 3, 2021

(65) Prior Publication Data

US 2022/0095294 A1 Mar. 24, 2022

Related U.S. Application Data

(63) Continuation of application No. PCT/CN2020/093693, filed on Jun. 1, 2020.

(30) Foreign Application Priority Data

Jun. 6, 2019 (CN) .......................... 201910492808.9

(51) Int. Cl.
*H04L 5/00* (2006.01)
*H04L 1/1867* (2023.01)
*H04W 72/20* (2023.01)

(52) U.S. Cl.
CPC ........... *H04W 72/20* (2023.01); *H04L 1/1896* (2013.01)

(58) Field of Classification Search
None
See application file for complete search history.

(56) References Cited

U.S. PATENT DOCUMENTS

| | | | | |
|---|---|---|---|---|
| 10,772,082 | B2* | 9/2020 | Wengerter | H04W 72/23 |
| 10,992,408 | B2* | 4/2021 | Hosseini | H04L 5/0058 |
| 11,223,452 | B2* | 1/2022 | Oh | H04W 72/23 |
| 11,290,226 | B2* | 3/2022 | Xu | H04L 5/0039 |
| 11,411,690 | B2* | 8/2022 | Moon | H04W 72/1273 |
| 11,647,513 | B2* | 5/2023 | Ying | H04L 1/189 370/336 |
| 11,902,023 | B2* | 2/2024 | Faxer | H04L 1/1887 |
| 2009/0147720 | A1 | 6/2009 | Wang et al. | |
| 2018/0367282 | A1 | 12/2018 | Li et al. | |
| 2019/0261354 | A1* | 8/2019 | Fakoorian | H04W 72/23 |
| 2020/0021403 | A1 | 1/2020 | Zheng et al. | |
| 2020/0228254 | A1 | 7/2020 | Ma et al. | |
| 2024/0106611 | A1* | 3/2024 | Wang | H04L 5/0091 |

FOREIGN PATENT DOCUMENTS

| | | |
|---|---|---|
| CN | 108270525 A | 7/2018 |
| CN | 108631960 A | 10/2018 |
| CN | 108633070 A | 10/2018 |
| CN | 109039529 A | 12/2018 |
| CN | 109586843 A | 4/2019 |
| WO | 2016123393 A1 | 4/2016 |
| WO | 2018171737 A1 | 9/2018 |
| WO | 2019062861 A1 | 4/2019 |
| WO | 2020225691 A1 | 11/2020 |

* cited by examiner

*Primary Examiner* — Sithu Ko
(74) *Attorney, Agent, or Firm* — Price Heneveld LLP

(57) ABSTRACT

The embodiments of the present disclosure provide a processing method and device. The method includes: receiving a redundancy version RV sequence, where an RV identity for last N transmission opportunities in the RV sequence is 0 or 3, and N is a positive integer; and decoding a retransmission position according to an RV identity order indicated by the RV sequence.

10 Claims, 7 Drawing Sheets

PROCESSING METHOD AND DEVICE

CROSS-REFERENCE TO RELATED APPLICATION

This application is a continuation application of International Application No. PCT/CN2020/093693 filed on Jun. 1, 2020, which claims priority to Chinese Patent Application No. 201910492808.9 filed in China on Jun. 6, 2019, which are incorporated herein by reference in their entireties.

TECHNICAL FIELD

An embodiment of the present disclosure relates to the technical field of communication, and in particular, to a processing method and device.

BACKGROUND

1. Introduction to New Radio Based Access to Unlicensed Spectrum (NR-U):

In a fifth generation (5G) mobile communication technology system, if an unlicensed band is to be used for data transmission and reception, a transmit end for a signal needs to satisfy the use rules for the unlicensed band. For an unlicensed band, before sending a signal, a transmit end needs to monitor whether the band is occupied (or is idle), and if the band is not occupied (or is idle), the transmit end may send the signal. If the band is occupied, the transmit end cannot send the signal, that is, listen-before-talk (LBT) fails.

2. Introduction to Downlink Semi-Persistent Scheduling (SPS):

For the transmission of downlink data, a network side may configure a periodic resource, such as configuring a starting position of the periodic resource (for example, a starting slot) and specific resource allocation (for example, a position of a physical resource block (PRB)). Further, the network side activates the periodic resource by using dynamic scheduling information (for example, downlink control information (DCI)).

For the unlicensed band, in the case that the physical downlink shared channel (PDSCH) for SPS is transmitted in the aggregation mode, the PDSCH with a redundancy version (RV) identity 0 may not be sent in a normal way as the frequency band is occupied, causing the terminal unable to decode in a normal way.

SUMMARY

One objective of embodiments of the present disclosure is to provide a processing method and a device to resolve the problem of data decoding failure.

In a first aspect, an embodiment of the present disclosure provides a processing method applied to a terminal, including:
receiving a redundancy version RV sequence, where an RV identity for last N transmission opportunities in the RV sequence is 0 or 3, and N is a positive integer; and
decoding a retransmission position according to an RV identity order indicated by the RV sequence.

In a second aspect, an embodiment of the present disclosure further provides a processing method applied to a network device, including:
sending an RV sequence, where an RV identity for last N transmission opportunities in the RV sequence is 0 or 3, and N is a positive integer.

In a third aspect, an embodiment of the present disclosure further provides a processing method applied to a terminal, including:
receiving control information carried by a data channel, where the control information includes: an RV identity for data information; and
decoding the data information in the data channel according to the control information.

In a fourth aspect, an embodiment of the present disclosure further provides a processing method applied to a network device, including:
sending control information carried by a data channel, where the control information includes: an RV identity for data information, and the RV identity is used to decode the data information in the data channel.

In a fifth aspect, an embodiment of the present disclosure further provides a processing method applied to a terminal, including:
receiving indication information, where the indication information indicates: a first RV identity, and the first RV identity is an RV identity other than RV0;
determining an RV sequence corresponding to the first RV identity according to a correspondence between an RV identity and an RV sequence;
decoding a retransmission position according to an RV identity order indicated by the RV sequence.

In a sixth aspect, an embodiment of the present disclosure further provides a processing method applied to a network device, including:
sending indication information, where the indication information indicates: a first RV identity, and the first RV identity is an RV identity other than RV0.

In a seventh aspect, an embodiment of the present disclosure further provides a processing method applied to a terminal, including:
detecting whether transmission of repeated data at a first transmission position is normal, where the first transmission position is a retransmission position corresponding to a first RV identity; and
if transmission of repeated data at a first transmission position is abnormal, skipping receiving repeated data at a second transmission position;
where the second transmission position is behind the first transmission position, and the first RV identity is RV identity 0 or RV identity 3.

In an eighth aspect, an embodiment of the present disclosure further provides a terminal including:
a first receiving module, configured to receive an RV sequence, where an RV identity for last N transmission opportunities in the RV sequence is 0 or 3, and N is a positive integer; and
a first decoding module, configured to decode a retransmission position according to an RV identity order indicated by the RV sequence.

In a ninth aspect, an embodiment of the present disclosure further provides a network device including:
a first sending module, configured to send an RV sequence, where an RV identity for last N transmission opportunities in the RV sequence is 0 or 3, and N is a positive integer.

In a tenth aspect, an embodiment of the present disclosure further provides a terminal including:
a second receiving module, configured to receive control information carried by a data channel, where the control information includes: an RV identity for data information; and a second decoding module, configured to decode the data information in the data channel according to the control information.

In an eleventh aspect, an embodiment of the present disclosure further provides a network device including:
a second sending module, configured to send control information carried by a data channel, where the control information includes:
an RV identity for data information, where the RV identity is used to decode the data information in the data channel.

In a twelfth aspect, an embodiment of the present disclosure further provides a terminal including:
a third receiving module, configured to receive indication information, where the indication information indicates:
a first RV identity, where the first RV identity is an RV identity other than RV0;
a determining module, configured to determine an RV sequence corresponding to the first RV identity according to a correspondence between an RV identity and an RV sequence; and
a third decoding module, configured to decode a retransmission position according to an RV identity order indicated by the RV sequence.

In a thirteenth aspect, an embodiment of the present disclosure further provides a network device including:
a third sending module, configured to send indication information, where the indication information indicates: a first RV identity, and the first RV identity is an RV identity other than RV0.

In a fourteenth aspect, an embodiment of the present disclosure further provides a terminal including:
a detection module, configured to detect whether transmission of repeated data at a first transmission position is normal, where the first transmission position is a retransmission position corresponding to a first RV identity; and
a processing module, configured to skip receiving repeated data at a second transmission position if transmission of repeated data at a first transmission position is abnormal;
where the second transmission position is behind the first transmission position, and the first RV identity is RV identity 0 or RV identity 3.

In a fifteenth aspect, an embodiment of the present disclosure further provides a communications device including: a processor, a memory, and a program that is stored in the memory and can run on the processor. The program, when executed by the processor, implements steps of the foregoing processing method.

In a sixteenth aspect, an embodiment of the present disclosure further provides a computer-readable storage medium with a computer program stored thereon, where the computer program implements steps of the foregoing processing method when executed by a processor.

In some embodiments of the present disclosure, data decoding failures, caused by abnormal transmission of data with RV identity 0 of a data channel for SPS, are reduced, and the reliability and timeliness of communication are improved;

In some other embodiments of the present disclosure, additional power consumption caused by still receiving, by a terminal, data that cannot be decoded is reduced, and the standby time of the terminal is prolonged.

BRIEF DESCRIPTION OF DRAWINGS

It becomes clear for a person of ordinary skill in the art to learn various other advantages and benefits by reading detailed description of the following optional implementation manners. Accompanying drawings are merely used for showing the optional implementation manners, and are not considered as a limitation on the present disclosure. In all accompanying drawings, a same reference symbol is used to indicate a same part. In the accompanying drawings.

DESCRIPTION OF EMBODIMENTS

Figure 1:
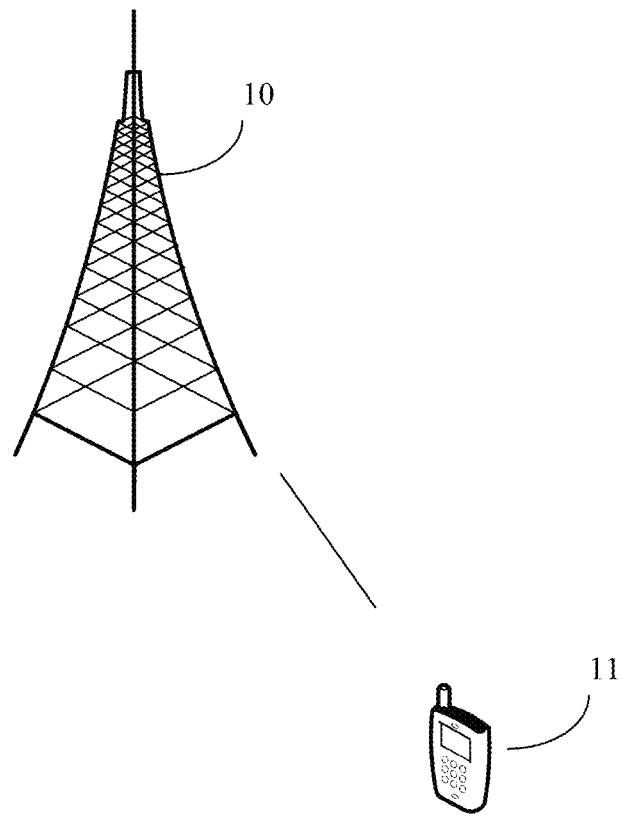
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application are intended to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The technology described in this specification is not limited to the 5th-generation (5G) system and subsequent evolved communications systems as well as LTE/LTE-advanced (LTE-A) systems, and may also be applied to various wireless communications systems such as code division multiple access (CDMA), time division multiple access (TDMA), frequency division multiple access (FDMA), orthogonal frequency division multiple access (OFDMA), and single-carrier frequency-division multiple access (SC-FDMA) systems, and other systems.

The terms "system" and "network" are usually used interchangeably. A CDMA system may implement radio technologies such as CDMA2000, universal terrestrial radio access (UTRA) and the like. UTRA includes wideband CDMA (WCDMA) and other CDMA variants. A TDMA system may implement radio technologies such as a global system for mobile communication (GSM) and the like. An OFDMA system may implement radio technologies such as ultra mobile broadband (UMB), evolved-UTRA (E-UTRA), IEEE802.11 (Wi-Fi), IEEE 802.16 (WiMAX), IEEE 802.20, Flash-OFDM and the like. UTRA and E-UTRA are parts of a universal mobile telecommunications system (UMTS). LTE and more advanced LTE (such as LTE-A) are new UMTS versions that use E-UTRA. UTRA, E-UTRA, UMTS, LTE, LTE-A, and GSM are described in a document of an organization named "3rd Generation Partnership Project" (3GPP). CDMA2000 and UMB are described in a document from an origination named "3rd Generation Partnership Project 2" (3GPP2). The technology described in this specification may also be used in the foregoing system and radio technology, and may also be used in another system and radio technology.

In order to improve the reliability of PDSCH transmission of a downlink data channel, same data may be sent multiple times (for example, be sent continuously multiple times by means of hybrid automatic repeat request (HARQ) retransmission), and a network side may configure a quantity of repetitions (for example, pdsch aggregation factor is 2/4/8) through a radio resource control (RRC) message. When the network side indicates a specific RV identity through DCI, an RV identity for an HARQ transmitted multiple times of a PDSCH of a terminal is determined by Table 1 (where n is an $n^{th}$ transmission opportunity among multiple transmission opportunities configured by a network, where a quantity of the multiple transmission opportunities is pdsch—AggregationFactor):

TABLE 1

| RV identities behind pdsch-AggregationFactor is configured | | | | |
|---|---|---|---|---|
| RV identity for PDSCH indicated by scheduling information | RV identity for a first an $n^{th}$ transmission opportunity (for example, n starts from 0) | | | |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

It should be noted that in DCI used for activating or deactivating an SPS resource, RV indication information can only indicate RV identity 0.

In the HARQ-related technologies, a data sender encodes information bits to which redundant bits are added, and divides them into different RV identities according to different coding modes. A data receiving end performs decoding depending on a specific RV identity.

A coding mode for RV identity 0 contains all information bits. If a terminal does not receive a data block with RV identity 0, the terminal will not be able to decode information bits in a correct way even if it receives data with other RV identities.

In a particular case, a coding mode for RV identity 3 may also contain all information bits. The terminal may simultaneously have multiple HARQ processes to parallel process multiple received data.

The embodiments of the present disclosure are described below with reference to the accompanying drawings. The processing method and device provided by the embodiments of the present disclosure may be applied to a wireless communications system. Referring to FIG. 1, it is a schematic architectural diagram of a wireless communications system provided by an embodiment of the present disclosure. As shown in FIG. 1, the wireless communications system may include: a network device 10 and a terminal 11. The terminal 11 may be denoted as a UE11, and the terminal 11 may communicate with the network device 10 (to transmit signaling or transmit data). In a practical application, a connection between the foregoing various devices may be a wireless connection. A solid line is used in FIG. 1 for easy and intuitive presentation of a connection relationship between the various devices.

The network device 10 provided by this embodiment of the present disclosure may be a base station, and the base station may be a commonly used base station, or an evolved node base station (eNB), or a network device (for example, a next generation node base station (gNB) or a transmission and reception point (TRP)) in a 5G system.

The terminal 11 provided by this embodiment of the present disclosure may be a mobile phone, a tablet computer, a notebook computer, an ultra-mobile personal computer (UMPC), a netbook or a personal digital assistant (PDA), a mobile Internet device (MID), a wearable device or vehicle-mounted device, or the like.

Figure 2:
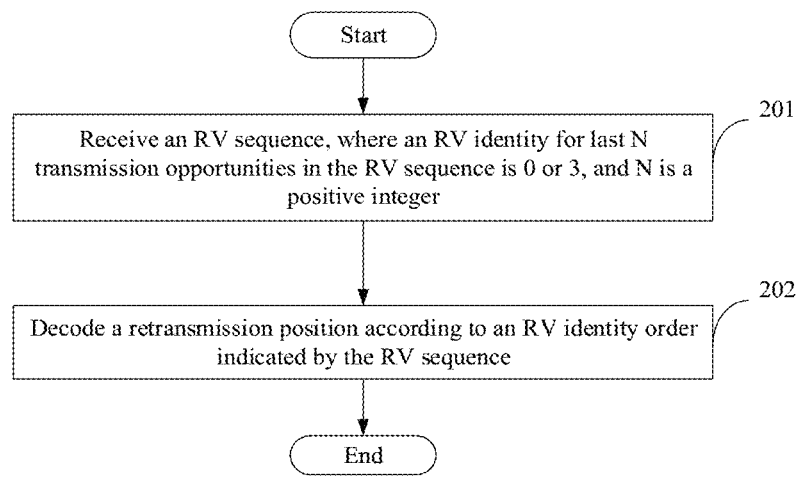
FIG. 2 is a first flowchart of a processing method according to an embodiment of the present disclosure.

Referring to FIG. 2, an embodiment of the present disclosure provides a processing method. The method is performed by a terminal, and includes: step 201 and step 202.

Step 201. Receive a redundancy version (RV) sequence, where an RV identity for last N transmission opportunities in the RV sequence is 0 or 3, and N is a positive integer;

For example, N is 1, and an RV identity for a last transmission opportunity in the RV sequence is 0 or 3; N is 2, and an RV identity for last two transmission opportunities in the RV sequence is 0 or 3.

In some embodiments, the RV sequence is received by using a radio resource control (RRC) message.

In some embodiments, RV identities in the RV sequence are all 0 or 3. For example, an RV sequence for 4 retransmission opportunities configured at a network side is [0,0,0,0], or [3,3,3,3].

In some embodiments, an RV identity for a last transmission opportunity in the RV sequence is 0 or 3. For example, an RV sequence for 4 retransmission opportunities configured at a network side is [x,y,z,0], or [x,y,z,3].

In some embodiments, RV identities for a first transmission opportunity and a last transmission opportunity in the RV sequence are 0 or 3. For example, an RV sequence for 4 retransmission opportunities configured at a network side is [0,x,y,0], or [3,x,y,3];

In some embodiments, an RV identity for a first transmission opportunity in the RV sequence is 0, and an RV identity for a last transmission opportunity in the RV sequence is 3. For example, an RV sequence for 4 retransmission opportunities configured at a network side is [0,x,y,3];

In some embodiments, an RV identity for a first transmission opportunity in the RV sequence is 3, and an RV identity for a last transmission opportunity in the RV sequence is 0. For example, an RV sequence for 4 retransmission opportunities configured at a network side is [3,x,y,0].

Step 202. Decode a retransmission position according to an RV identity order indicated by the RV sequence.

In some embodiments, when a semi-persistent scheduling (SPS) activation command or SPS deactivation command is received, a retransmission position is decoded according to an RV identity order indicated by the RV sequence.

In some embodiments, when an RRC message is received, and the RRC message indicates a resource used for SPS, a retransmission position is decoded according to an RV identity order indicated by the RV sequence.

In some embodiments, in the case that a quantity of retransmission positions is the same as a quantity of RV identities in the RV sequence, the retransmission positions are decoded in sequence according to an RV identity order indicated by the RV sequence.

In some embodiments, in the case that a quantity of retransmission positions is greater than a quantity of RV identities in the RV sequence, an RV identity order indicated by the RV sequence is repeatedly used to decode a retransmission position in sequence.

Exemplarily, there are 4 retransmission positions of SPS PDSCH, and the RV sequence configured in step 201 is [2,3,1,0], then the terminal uses RV identity 2 for decoding at a first retransmission position, uses RV identity 3 for decoding at a second retransmission position, uses RV identity 1 for decoding at a third retransmission position, and uses RV identity 0 for decoding at a fourth retransmission position.

Exemplarily, there are 4 retransmission positions of SPS PDSCH, and the RV sequence configured in step 201 is [1,0], then the terminal uses RV identity 1 for decoding at a first retransmission position, and uses RV identity 0 for decoding at a second retransmission position, uses RV identity 1 for decoding at a third retransmission position, and uses RV identity 0 for decoding at a fourth retransmission position.

In this embodiment of the present disclosure, data decoding failures caused by abnormal transmission of data with RV identity 0 of a data channel for SPS are reduced.

Figure 3:
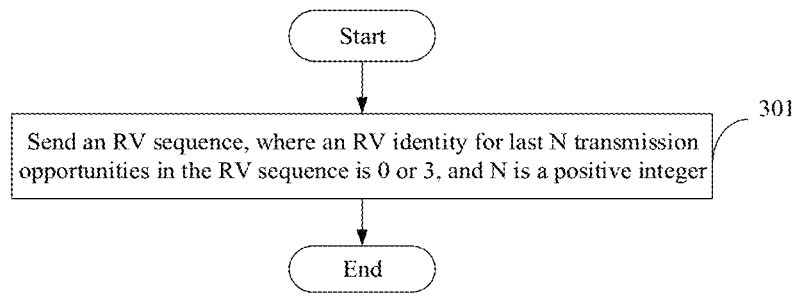
FIG. 3 is a second flowchart of a processing method according to an embodiment of the present disclosure.

Referring to FIG. 3, an embodiment of the present disclosure provides a processing method. The method is performed by a network device, and includes: step 301.

Step 301. Send an RV sequence. An RV identity for last N transmission opportunities in the RV sequence is 0 or 3, and N is a positive integer.

Optionally, in the case that resending of data is configured at a network side, for example, pdsch-AggregationFactor=4 is configured, the network side configures a terminal with an RV sequence, and the RV sequence indicates an RV identity order. In some embodiments, an RV sequence is configured by using an RRC message.

In some embodiments, RV identities in the RV sequence are all 0 or 3. For example, an RV sequence for 4 retransmission opportunities configured at a network side is [0,0,0,0], or [3,3,3,3].

In some embodiments, an RV identity for a last transmission opportunity in the RV sequence is 0 or 3. For example, an RV sequence for 4 retransmission opportunities configured at a network side is [x,y,z,0], or [x,y,z,3].

In some embodiments, RV identities for a first transmission opportunity and a last transmission opportunity in the RV sequence are 0 or 3. For example, an RV sequence for 4 retransmission opportunities configured at a network side is [0,x,y,0], or [3,x,y,3];

In some embodiments, an RV identity for a first transmission opportunity in the RV sequence is 0, and an RV identity for a last transmission opportunity in the RV sequence is 3. For example, an RV sequence for 4 retransmission opportunities configured at a network side is [0,x,y,3];

In some embodiments, an RV identity for a first transmission opportunity in the RV sequence is 3, and an RV identity for a last transmission opportunity in the RV sequence is 0. For example, an RV sequence for 4 retransmission opportunities configured at a network side is [3,x,y,0].

In this embodiment of the present disclosure, data decoding failures caused by abnormal transmission of data with RV identity 0 of a data channel for SPS are reduced.

Figure 4:
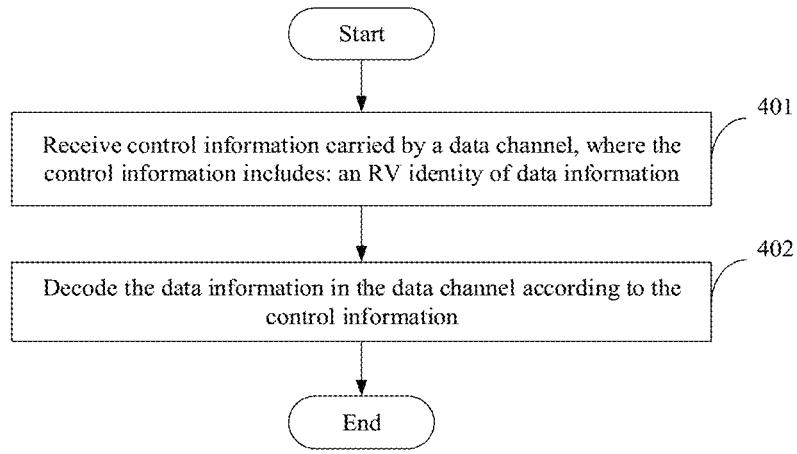
FIG. 4 is a third flowchart of a processing method according to an embodiment of the present disclosure.

Referring to FIG. 4, an embodiment of the present disclosure provides a processing method. The method is performed by a terminal, and includes: step 401 and step 402.

Step 401. Receive control information carried by a data channel, where the control information includes: an RV identity for data information;

Exemplarily, a PDSCH for SPS carries control information, and the control information indicates an RV identity.

Step 402. Decode the data information in the data channel according to the control information.

Exemplarily, the control information indicates RV identity 0, and the terminal decodes the data information by using RV identity 0.

In some implementation manners, the control information further includes at least one of the following:
(1) an HARQ process number of the data information;
(2) a modulation and coding scheme for the data information.

In some implementation manners, a multiplexing mode for the control information and the data information includes: the control information and the data information being located at independent physical resource positions separately, for example, independent resource elements (RE).

In some implementation manners, the control information and the data information being located at independent physical resource positions separately includes any one of the following:
(1) the control information being located at n starting positions of a number of PRB, and the data information being located at another position of the PRB (see FIG. 5a);
(2) the control information being located at last n positions of a number of PRB, and the data information being located at another position of the PRB (see FIG. 5b);
(3) the control information being located at n rows with the lowest frequency domain numeric value of an RE, and the data information being located at the another position of an RE (see FIG. 5a);
(4) the control information being located at n rows with the highest frequency domain numeric value of an RE, and the data information being located at the another position of an RE (see FIG. 5b);
(5) the control information being located at n columns with the lowest time domain numeric value of an RE, and the data information being located at the another position of an RE (see FIG. 5c);
(6) the control information being located at n columns with the highest time domain numeric value of an RE, and the data information being located at the another position of an RE (see FIG. 5d);
(7) the control information being located at n columns with the lowest time domain numeric value and m rows with the lowest frequency domain numeric value of an RE, and the data information being located at the another position of an RE (see FIG. 5e);
(8) the control information being located at n columns with the highest time domain numeric value and m rows with the lowest frequency domain numeric value of an RE, and the data information being located at the another position of an RE (see FIG. 5f);
(9) the control information being located at n columns with the lowest time domain numeric value and m rows with the highest frequency domain numeric value of an RE, and the data information being located at the another position of an RE (see FIG. 5g);
(10) the control information being located at n columns with the highest time domain numeric value and m rows with the highest frequency domain numeric value of an RE, and the data information being located at the another position of an RE (see FIG. 5h);
where n is a positive integer, and m is a positive integer.

In this embodiment of the present disclosure, data decoding failures caused by abnormal transmission of data with RV identity 0 of a data channel for SPS are reduced.

Figure 6:
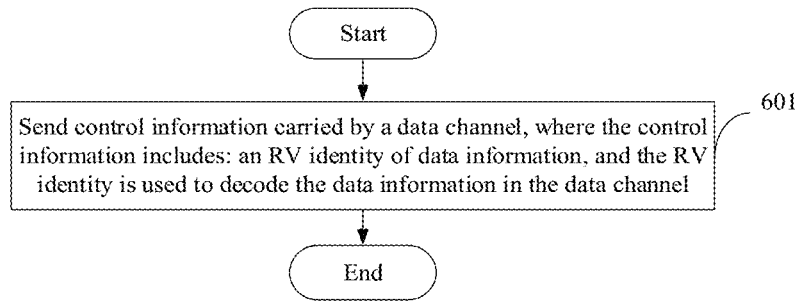
FIG. 6 is a fourth flowchart of a processing method according to an embodiment of the present disclosure.

Referring to FIG. 6, an embodiment of the present disclosure provides a processing method. The method is performed by a network device, and includes: step 601.

Step 601. Send control information carried by a data channel, where the control information includes: an RV identity for data information, and the RV identity is used to decode the data information in the data channel.

In some implementation manners, the control information further includes at least one of the following:
(1) a hybrid automatic repeat request HARQ process number of the data information;
(2) a modulation and coding scheme for the data information.

In some implementation manners, a multiplexing mode for the control information and the data information includes: the control information and the data information being located at independent physical resource positions separately.

In some implementation manners, the control information and the data information being located at independent physical resource positions separately includes any one of the following:
(1) the control information being located at n starting positions of a number of PRB, and the data information being located at another position of the PRB (see FIG. 5a);
(2) the control information being located at last n positions of a number of PRB, and the data information being located at another position of the PRB (see FIG. 5b);
(3) the control information being located at n rows with the lowest frequency domain numeric value of a resource element RE, and the data information being located at the another position of an RE (see FIG. 5a)
(4) the control information being located at n rows with the highest frequency domain numeric value of an RE, and the data information being located at the another position of an RE (see FIG. 5b);
(5) the control information being located at n columns with the lowest time domain numeric value of an RE, and the data information being located at the another position of an RE (see FIG. 5c);
(6) the control information being located at n columns with the highest time domain numeric value of an RE, and the data information being located at the another position of an RE (see FIG. 5d);
(7) the control information being located at n columns with the lowest time domain numeric value and m rows with the lowest frequency domain numeric value of an RE, and the data information being located at the another position of an RE (see FIG. 5e);
(8) the control information being located at n columns with the highest time domain numeric value and m rows with the lowest frequency domain numeric value of an RE, and the data information being located at the another position of an RE (see FIG. 5f);
(9) the control information being located at n columns with the lowest time domain numeric value and m rows with the highest frequency domain numeric value of an RE, and the data information being located at the another position of an RE (see FIG. 5g);
(10) the control information being located at n columns with the highest time domain numeric value and m rows with the highest frequency domain numeric value of an RE, and the data information being located at the another position of an RE (see FIG. 5h);
where n is a positive integer, and m is a positive integer.

In this embodiment of the present disclosure, data decoding failures caused by abnormal transmission of data with RV identity 0 of a data channel for SPS are reduced.

Figure 7:
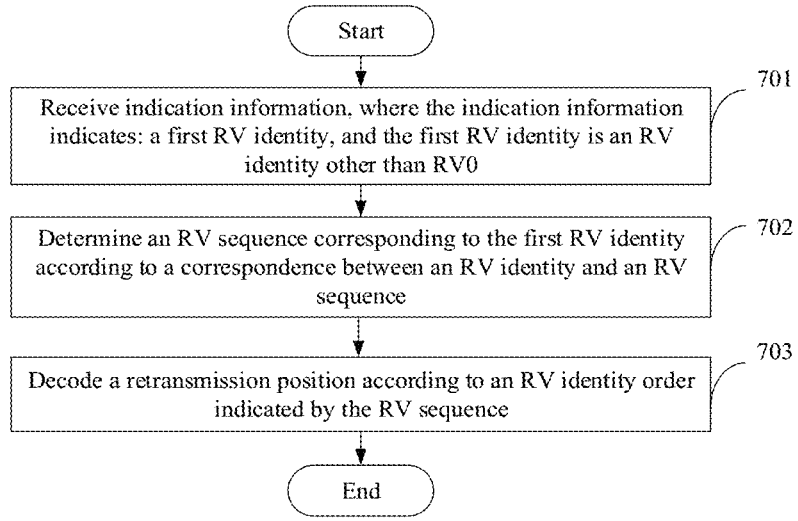
FIG. 7 is a fifth flowchart of a processing method according to an embodiment of the present disclosure.

Referring to FIG. 7, an embodiment of the present disclosure provides a processing method. The method is performed by a terminal, and includes: step 701, step 702 and step 703.

Step 701. Receive indication information, where the indication information indicates: a first RV identity, and the first RV identity is an RV identity other than RV0, for example, RV identity 2;

In some implementation manners, an SPS activation command or SPS deactivation command is received, and the SPS activation command or SPS deactivation command includes: the indication information.

Step 702. Determine an RV sequence corresponding to the first RV identity according to a correspondence between an RV identity and an RV sequence;

Exemplarily, for the correspondence between an RV identity and an RV sequence, reference may be made to the foregoing Table 1.

Step 703. Decode a retransmission position according to an RV identity order indicated by the RV sequence.

In some implementation manners, the correspondence between an RV identity and an RV sequence is agreed upon in a protocol or configured by a network side. Exemplarily, the correspondences shown in Table 1 are agreed upon in a protocol or configured by a network side.

Exemplarily, an SPS activation or deactivation command indicates RV identity 2, a quantity of retransmissions configured by a network is 4, and a terminal determines an RV identity order [2,3,1,0] according to Table 1, and decodes 4 retransmission positions in turn.

In this embodiment of the present disclosure, data decoding failures caused by abnormal transmission of data with RV identity 0 of a data channel for SPS are reduced.

Figure 8:
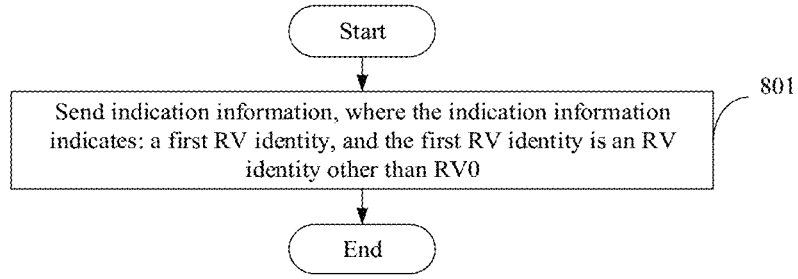
FIG. 8 is a sixth flowchart of a processing method according to an embodiment of the present disclosure.

Referring to FIG. 8, an embodiment of the present disclosure provides a processing method. The method is performed by a network device, and includes: step 801.

Step 801. Send indication information, where the indication information indicates: a first RV identity, and the first RV identity is an RV identity other than RV0, for example, RV identity 2.

In some implementation manners, an SPS activation command or SPS deactivation command is sent, and the SPS activation command or SPS deactivation command includes: the indication information.

In this embodiment of the present disclosure, data decoding failures caused by abnormal transmission of data with RV identity 0 of a data channel for SPS are reduced.

Figure 9:
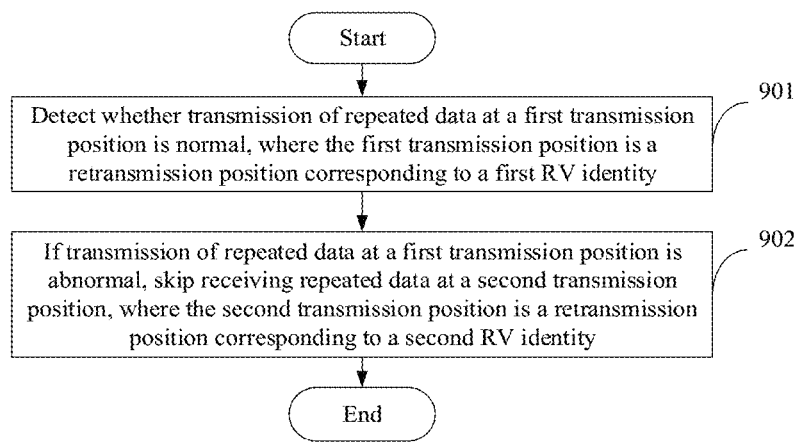
FIG. 9 is a seventh flowchart of a processing method according to an embodiment of the present disclosure.

Referring to FIG. 9, an embodiment of the present disclosure provides a processing method. The method is performed by a terminal, and includes: step 901 and step 902.

Step 901. Detect whether transmission of repeated data at a first transmission position is normal, where the first transmission position is a retransmission position corresponding to a first RV identity;

Step 902. If transmission of repeated data at a first transmission position is abnormal, skipping receiving repeated data at a second transmission position;

where the second transmission position is behind the first transmission position, and the first RV identity is RV identity 0 or RV identity 3.

In some implementation manners, abnormal transmission of repeated data at a first transmission position includes at least one of the following: loss of repeated data at the first transmission position; and no sending of repeated data at the first transmission position.

In this embodiment of the present disclosure, for repeatedly transmitted data, if an RV sequence indicated by a network side includes RV identity 0 or 3 and another RV identity, a terminal ignores reception of repeated data at a retransmission position corresponding to the subsequent RV identity 0 or 3 when the terminal detects loss (or no sending) of data transmitted at a retransmission position corresponding to RV identity 0 or 3.

In some implementation manners, the second transmission position includes: the nearest one retransmission position behind the first transmission position, where an RV identity for a first the one retransmission position is different from the first RV identity;

In some implementation manners, the second transmission position includes: multiple retransmission positions behind the first transmission position, where RV identities for the multiple retransmission positions are different from the first RV identity.

Exemplarily, a quantity of repetitions of a PDSCH configured by a network is 4, and an RV identity order for 4 data transmissions is [0,2,3,1]. When detecting loss of data with RV identity 0 for a first repetition, the terminal will no longer receive data of subsequent 3 repetitions.

For example, when detecting loss (or no sending) of data sent at a resending position corresponding to RV identity 0, the terminal ignores reception of the subsequent nearest repeated data with a non-zero RV identity.

Exemplarily, a quantity of repetitions of a PDSCH configured by a network is 4, and an RV identity order for 4 data transmissions is [0,2,0,2]. When detecting loss of repeated data with RV identity 0 for a first repetition, the terminal will no longer receive subsequent repeated data with RV identity 2 for a second repetition, and still no longer receives repeated data with RV identity 0 for a third repetition, and still no longer receives repeated data with RV identity 2 for a fourth repetition.

In some implementation manners, the second transmission position includes: multiple retransmission positions behind the first transmission position, where at least some of RV identities for the multiple retransmission positions are the same as the first RV identity. For example, after detecting loss (or no sending) of data with RV identity 0, the terminal ignores reception of the subsequent repeated data.

Exemplarily, a quantity of repetitions of a PDSCH configured by a network is 4, and an RV identity order for 4 data transmissions is [0,2,0,2]. After detecting loss of data with an RV identity 0 for the first time, the terminal will no longer receive data of subsequent 3 repetitions.

In this embodiment of the present disclosure, additional power consumption caused by still receiving, by a terminal, data that cannot be decoded is reduced, and the standby time of the terminal is prolonged.

Figure 10:
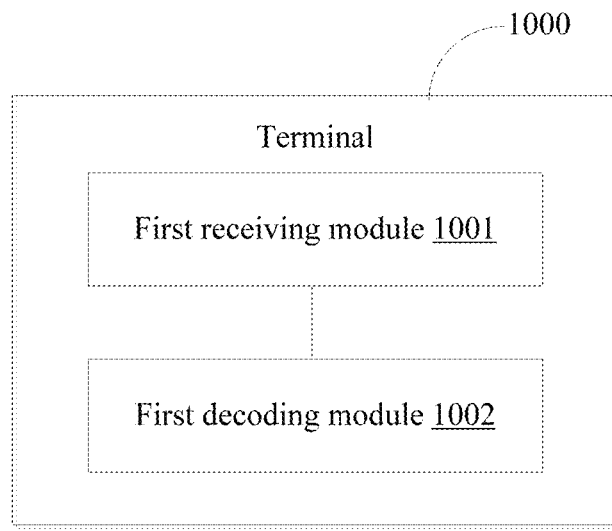
FIG. 10 is a first schematic structural diagrams of a terminal according to an embodiment of the present disclosure.

An embodiment of the present disclosure further provides a terminal. A problem solving principle of the terminal is similar to that of the processing method in the embodiments of the present disclosure. Therefore, for implementation of the terminal, reference may be made to the implementation of the method, and details are not repeated again. Referring to FIG. 10, the terminal 1000 includes:

a first receiving module 1001, configured to receive an RV sequence, where an RV identity for last N transmission opportunities in the RV sequence is 0 or 3, and N is a positive integer; and a first decoding module 1002, configured to decode a retransmission position according to an RV identity order indicated by the RV sequence.

In some implementation manners, the first receiving module 1001 is further configured to: receive the RV sequence by using an RRC message.

In some implementation manners, RV identities in the RV sequence are all 0 or 3; or an RV identity for a last transmission opportunity in the RV sequence is 0 or 3; or RV identities for a first transmission opportunity and a last transmission opportunity in the RV sequence are 0 or 3; or an RV identity for a first transmission opportunity in the RV sequence is 0, and an RV identity for a last transmission opportunity in the RV sequence is 3; or an RV identity for a first transmission opportunity in the RV sequence is 3, and an RV identity for a last transmission opportunity in the RV sequence is 0.

In some implementation manners, the first decoding module 1002 is further configured to: when a semi-persistent scheduling SPS activation command or SPS deactivation command is received, a retransmission position is decoded according to an RV identity order indicated by the RV sequence; or when an RRC message is received, and the RRC message indicates a resource used for SPS, a retransmission position is decoded according to an RV identity order indicated by the RV sequence.

In some implementation manners, the first decoding module 1002 is further configured to: a retransmission position is decoded according to an RV identity order indicated by the RV sequence in the case that a quantity of retransmission positions is the same as a quantity of RV identities in the RV sequence; in the case that a quantity of retransmission positions is greater than a quantity of RV identities in the RV sequence, an RV identity order indicated by the RV sequence is repeatedly used to decode a retransmission position.

The terminal provided in this embodiment of the present disclosure may perform the method embodiment shown in FIG. 2. An implementation principle and a technical effect of the terminal are similar to those of the method embodiment, and details are not described again in this embodiment.

An embodiment of the present disclosure further provides a network device. As a problem-solving principle of the network device is similar to that of the processing method in the embodiments of the present disclosure, for implementation of the network device, reference may be made to implementation of the method, and description is not repeated herein.

Figure 11:
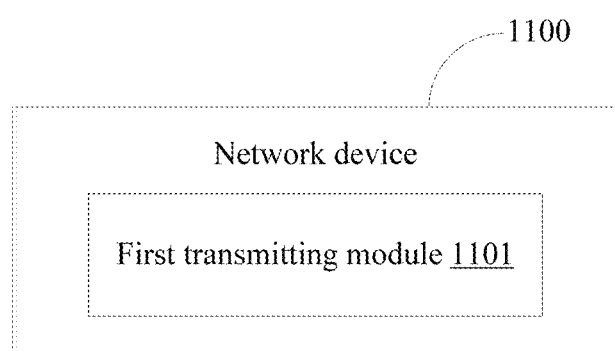
FIG. 11 is a first schematic structural diagram of a network device according to an embodiment of the present disclosure.

Referring to FIG. 11, the network device 1100 includes:
a first sending module 1101, configured to send an RV sequence, where an RV identity for last N transmission opportunities in the RV sequence is 0 or 3, and N is a positive integer.

In some implementation manners, the first sending module 1101 is further configured to send the RV sequence by using an RRC message.

In some implementation manners, RV identities in the RV sequence are all 0 or 3; or an RV identity for a last a last transmission opportunity in the RV sequence is 0 or 3; or RV identities for a first transmission opportunity and a last transmission opportunity in the RV sequence are 0 or 3; or an RV identity for a first transmission opportunity in the RV sequence is 0, and an RV identity for a last transmission opportunity in the RV sequence is 3; or an RV identity for a first transmission opportunity in the RV sequence is 3, and an RV identity for a last transmission opportunity in the RV sequence is 0.

The network device provided in this embodiment of the present disclosure may perform the foregoing method embodiment shown in FIG. 3. An implementation principle and a technical effect of the network device are similar to those of the method embodiment, and details are not described again in this embodiment.

An embodiment of the present disclosure further provides a terminal. A problem solving principle of the terminal is similar to that of the processing method in the embodiments of the present disclosure. Therefore, for implementation of the terminal, reference may be made to the implementation of the method, and details are not repeated again.

Figure 12:
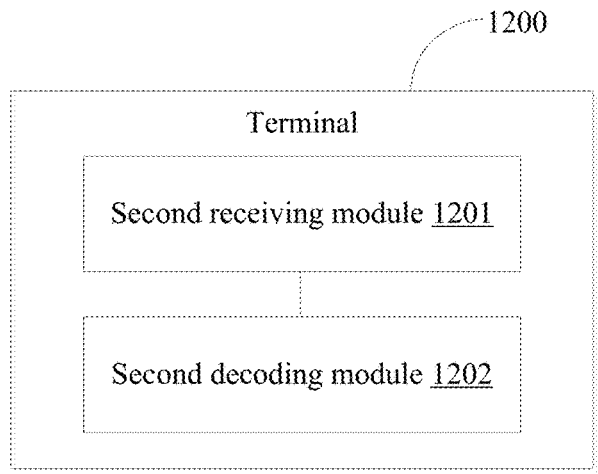
FIG. 12 is a second schematic structural diagram of a terminal according to an embodiment of the present disclosure.

Referring to FIG. 12, the terminal 1200 includes:
a second receiving module 1201, configured to receive control information carried by a data channel, where the control information includes: an RV identity for data information; and a second decoding module 1202, configured to decode the data information in the data channel according to the control information.

In some implementation manners, the control information further includes at least one of the following: (1) an HARQ process number of the data information; (2) a modulation and coding scheme for the data information.

In some implementation manners, a multiplexing mode for the control information and the data information includes: the control information and the data information being located at independent physical resource positions separately.

Figure 5A:
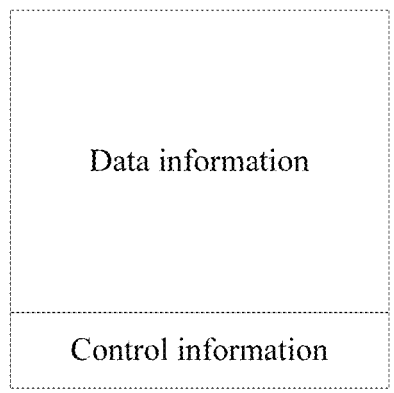
FIGS. 5a to 5h are schematic diagrams of multiplexing modes for data information and control information according to an embodiment of the present disclosure.
Figure 5B:
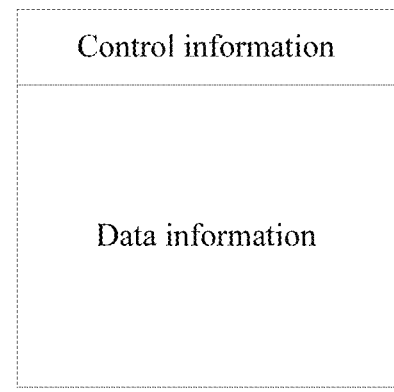

In some implementation manners, the control information and the data information being located at independent physical resource positions separately includes any one of the following:

(1) the control information being located at n starting positions of a number of a physical resource block PRB, and the data information being located at another position of the PRB (see FIG. 5*a*);

(2) the control information being located at last n positions of a number of PRB, and the data information being located at another position of the PRB (see FIG. 5*b*);

(3) the control information being located at n rows with the lowest frequency domain numeric value of a resource element RE, and the data information being located at the another position of an RE (see FIG. 5*a*)

Figure 5C:
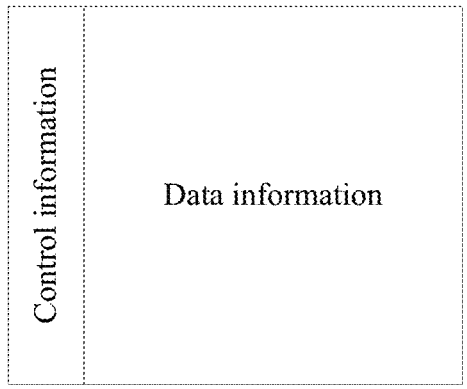
Figure 5D:
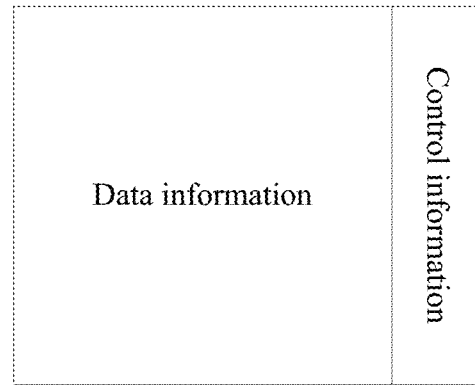
Figure 5E:
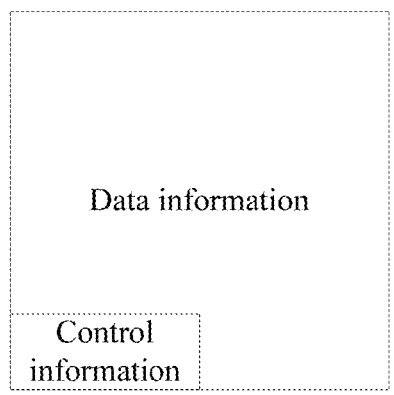
Figure 5F:
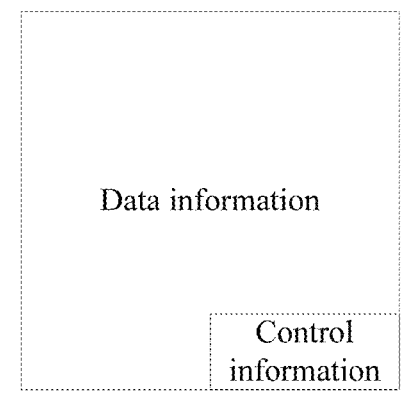
Figure 5G:
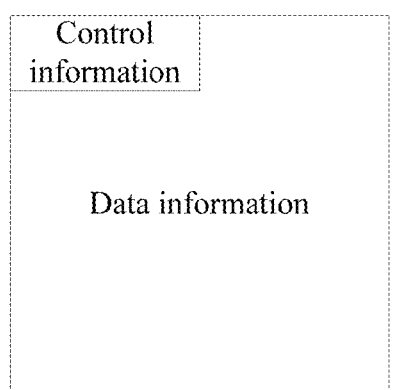
Figure 5H:
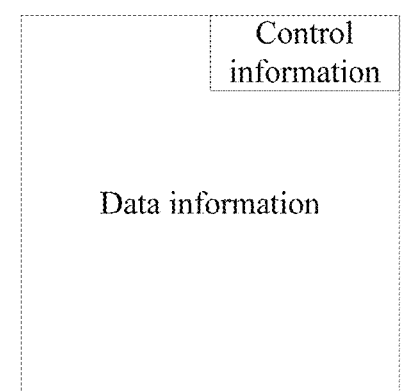

(4) the control information being located at n rows with the highest frequency domain numeric value of an RE, and the data information being located at the another position of an RE (see FIG. 5*b*);

(5) the control information being located at n columns with the lowest time domain numeric value of an RE, and the data information being located at the another position of an RE (see FIG. 5*c*);

(6) the control information being located at n columns with the highest time domain numeric value of an RE, and the data information being located at the another position of an RE (see FIG. 5*d*);

(7) the control information being located at n columns with the lowest time domain numeric value and m rows with the lowest frequency domain numeric value of an RE, and the data information being located at the another position of an RE (see FIG. 5*e*);

(8) the control information being located at n columns with the highest time domain numeric value and m rows with the lowest frequency domain numeric value of an RE, and the data information being located at the another position of an RE (see FIG. 5*f*);

(9) the control information being located at n columns with the lowest time domain numeric value and m rows with the highest frequency domain numeric value of an RE, and the data information being located at the another position of an RE (see FIG. 5*g*);

(10) the control information being located at n columns with the highest time domain numeric value and m rows with the highest frequency domain numeric value of an RE, and the data information being located at the another position of an RE (see FIG. 5*h*);

where n is a positive integer, and m is a positive integer.

The terminal provided in this embodiment of the present disclosure may perform the foregoing method embodiment shown in FIG. 4. An implementation principle and a technical effect of the terminal are similar to those of the method embodiment, and details are not described again in this embodiment.

An embodiment of the present disclosure further provides a network device. As a problem-solving principle of the network device is similar to that of the processing method in the embodiments of the present disclosure, for implementation of the network device, reference may be made to implementation of the method, and description is not repeated herein.

Figure 13:
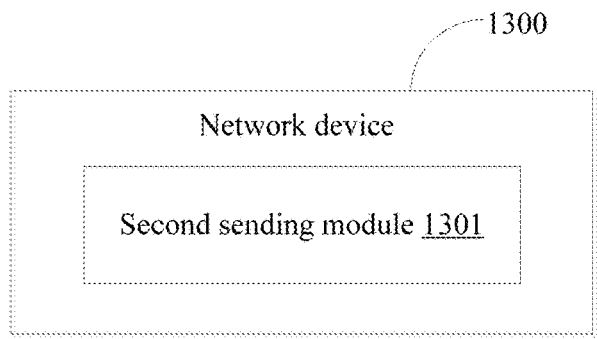
FIG. 13 is a second schematic diagram of a network device according to an embodiment of the present disclosure.

Referring to FIG. 13, the network device 1300 includes:
a second sending module 1301, configured to send control information carried by a data channel, where the control information includes: an RV identity for data information, and the RV identity is used to decode the data information in the data channel.

In some implementation manners, the control information further includes at least one of the following: (1) an HARQ process number of the data information; (2) a modulation and coding scheme for the data information.

In some implementation manners, a multiplexing mode for the control information and the data information includes: the control information and the data information being located at independent physical resource positions separately.

In some implementation manners, the control information and the data information being located at independent physical resource positions separately includes any one of the following:
(1) the control information being located at n starting positions of a number of a physical resource block PRB, and the data information being located at another position of the PRB (see FIG. 5a);
(2) the control information being located at last n positions of a number of PRB, and the data information being located at another position of the PRB (see FIG. 5b);
(3) the control information being located at n rows with the lowest frequency domain numeric value of a resource element RE, and the data information being located at the another position of an RE (see FIG. 5a)
(4) the control information being located at n rows with the highest frequency domain numeric value of an RE, and the data information being located at the another position of an RE (see FIG. 5b);
(5) the control information being located at n columns with the lowest time domain numeric value of an RE, and the data information being located at the another position of an RE (see FIG. 5c);
(6) the control information being located at n columns with the highest time domain numeric value of an RE, and the data information being located at the another position of an RE (see FIG. 5d);
(7) the control information being located at n columns with the lowest time domain numeric value and m rows with the lowest frequency domain numeric value of an RE, and the data information being located at the another position of an RE (see FIG. 5e);
(8) the control information being located at n columns with the highest time domain numeric value and m rows with the lowest frequency domain numeric value of an RE, and the data information being located at the another position of an RE (see FIG. 5f);
(9) the control information being located at n columns with the lowest time domain numeric value and m rows with the highest frequency domain numeric value of an RE, and the data information being located at the another position of an RE (see FIG. 5g);
(10) the control information being located at n columns with the highest time domain numeric value and m rows with the highest frequency domain numeric value of an RE, and the data information being located at the another position of an RE (see FIG. 5h);

where n is a positive integer, and m is a positive integer.

The network device provided in this embodiment of the present disclosure may perform the foregoing method embodiment shown in FIG. 6. An implementation principle and a technical effect of the network device are similar to those of the method embodiment, and details are not described again in this embodiment.

An embodiment of the present disclosure further provides a terminal. A problem solving principle of the terminal is similar to that of the processing method in the embodiments of the present disclosure. Therefore, for implementation of the terminal, reference may be made to the implementation of the method, and details are not repeated again.

Figure 14:
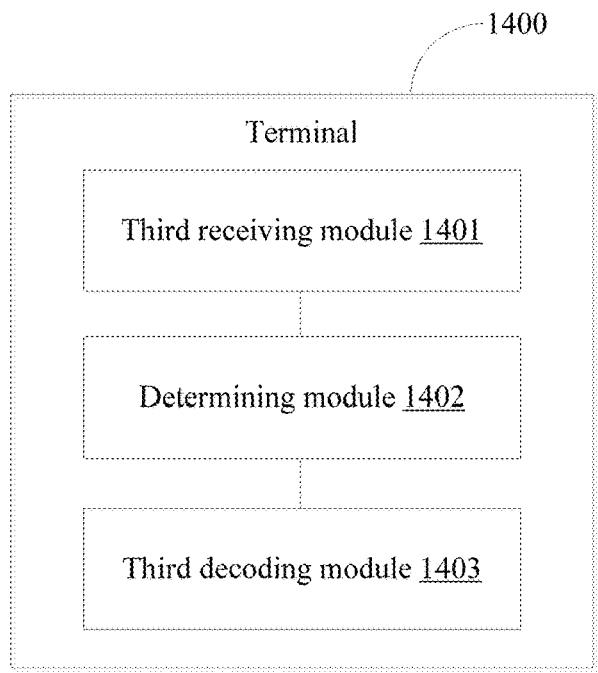
FIG. 14 is a third schematic structural diagram of a terminal according to an embodiment of the present disclosure.

Referring to FIG. 14, the terminal 1400 includes:
a third receiving module 1401, configured to receive indication information, where the indication information indicates: a first RV identity, and the first RV identity is an RV identity other than RV0;
a determining module 1402, configured to determine an RV sequence corresponding to the first RV identity according to a correspondence between an RV identity and an RV sequence; and
a third decoding module 1403, configured to decode a retransmission position according to an RV identity order indicated by the RV sequence.

In some implementation manners, the third receiving module 1401 is further configured to: receive an SPS activation command or SPS deactivation command, where the SPS activation command or SPS deactivation command includes: the indication information.

In some implementation manners, the correspondence between an RV identity and an RV sequence is agreed upon in a protocol or configured by a network side.

The terminal provided in this embodiment of the present disclosure may perform the foregoing method embodiment of FIG. 7. An implementation principle and a technical effect of the terminal are similar to those of the method embodiment, and details are not described again in this embodiment.

An embodiment of the present disclosure further provides a network device. As a problem-solving principle of the network device is similar to that of the processing method in the embodiments of the present disclosure, for implementation of the network device, reference may be made to implementation of the method, and description is not repeated herein.

Figure 15:
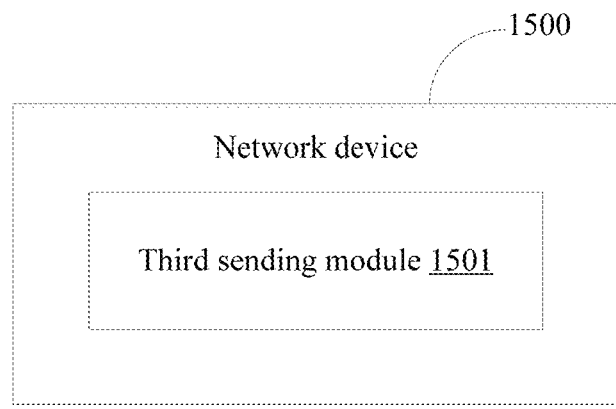
FIG. 15 is a third schematic structural diagram of a network device according to an embodiment of the present disclosure.

Referring to FIG. 15, the network device 1500 includes:
a third sending module 1501, configured to send indication information, where the indication information indicates: a first RV identity, and the first RV identity is an RV identity other than RV0.

In some implementation manners, the third sending module 1501 is further configured to: send an SPS activation command or SPS deactivation command, where the SPS activation command or SPS deactivation command includes: the indication information.

The network device provided in this embodiment of the present disclosure may perform the foregoing method embodiment shown in FIG. 8. An implementation principle and a technical effect of the network device are similar to those of the method embodiment, and details are not described again in this embodiment.

An embodiment of the present disclosure further provides a terminal. A problem solving principle of the terminal is similar to that of the processing method in the embodiments of the present disclosure. Therefore, for implementation of the terminal, reference may be made to the implementation of the method, and details are not repeated again.

Figure 16:
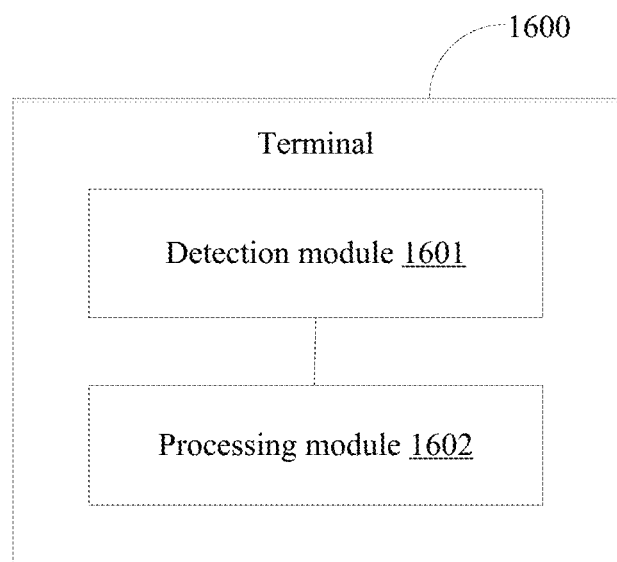
FIG. 16 is a fourth schematic structural diagram of a terminal according to an embodiment of the present disclosure.

Referring to FIG. 16, the terminal 1600 includes:
a detection module 1601, configured to detect whether transmission of repeated data at a first transmission position is normal, where the first transmission position is a retransmission position corresponding to a first RV identity; and
a processing module 1602, configured to skip receiving repeated data at a second transmission position if transmission of repeated data at a first transmission position is abnormal;
where the second transmission position is behind the first transmission position, and the first RV identity is RV identity 0 or RV identity 3.

In some implementation manners, the second transmission position includes: multiple retransmission positions behind the first transmission position, where RV identities for the multiple retransmission positions are all different from the first RV identity; or
the second transmission position includes: the nearest one retransmission position behind the first transmission position, where an RV identity for a first the one retransmission position is different from the first RV identity; or
The second transmission position includes: multiple retransmission positions behind the first transmission position, where at least some of RV identities for the multiple retransmission positions are the same as the first RV identity.

In some implementation manners, abnormal transmission of repeated data at a first transmission position includes at least one of the following: (1) loss of repeated data at the first transmission position; and (2) no sending of repeated data at the first transmission position.

The terminal provided in this embodiment of the present disclosure may perform the foregoing method embodiment shown in FIG. 9. An implementation principle and a technical effect of the terminal are similar to those of the method embodiment, and details are not described again in this embodiment.

Figure 17:
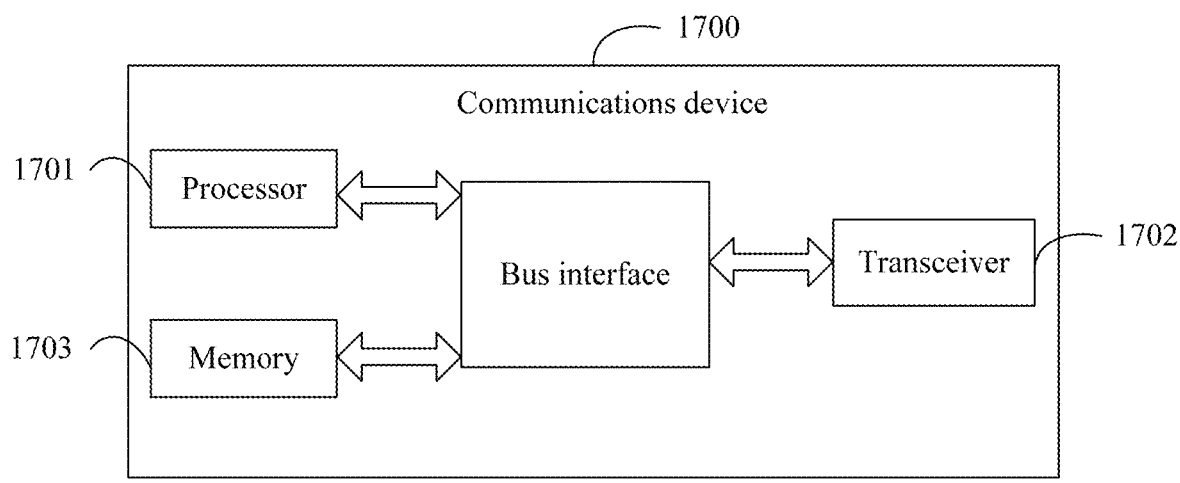
FIG. 17 is a schematic structural diagram of a communications device according to an embodiment of the present disclosure.

Referring to FIG. 17, FIG. 17 is a structural diagram of a communications device applied in an embodiment of the present disclosure. As shown in FIG. 17, the communications device 1700 includes: a processor 1701, a transceiver 1702, a memory 1703, and a bus interface, where the processor 1701 may be responsible for bus architecture management and general processing. The memory 1703 may store data used by the processor 1701 when the processor 1701 performs an operation.

In one embodiment of the present disclosure, the communications device 1700 further includes: a computer program that is stored in the memory 1703 and that can run on the processor 1701. The computer program implements steps of the above method when executed by the processor 1701.

In FIG. 17, a bus architecture may include any quantity of interconnected buses and bridges, which are specifically linked together by various circuits of one or more processors represented by the processor 1701 and a memory represented by the memory 1703. The bus architecture may further connect various other circuits such as peripheral devices, voltage regulators, and power management circuits, which are all known in the art, and therefore, no further description is given herein. The bus interface provides an interface. The transceiver 1702 may be multiple elements, including a transmitter and a receiver, and provides a unit for communicating on a transmission medium with various other devices.

The communications device provided in this embodiment of the present disclosure may perform the foregoing method embodiments. An implementation principle and a technical effect of the communications device are similar to those of the method embodiments, and details are not described again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a random access memory (RAM), a flash memory, a read-only memory (ROM), and an erasable programmable read-only memory (Erasable PROM, EPROM), an electrically erasable programmable read-only memory (Electrically EPROM, EEPROM), a register, a hard disk, a mobile hard disk, a compact disc read-only memory, or a storage medium of any other form known in the art. An exemplary storage medium is coupled to the processor, so that the processor can read information from the storage medium and can write information to the storage medium. Certainly, the storage medium may also be an integral part of the processor. The processor and the storage medium may be carried in an application specific integrated circuit (ASIC). In addition, the ASIC may be carried in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of embodiments. It should be understood that the foregoing descriptions are merely description of embodiments of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

The invention claimed is:

1. A processing method performed by a terminal, comprising:
  receiving a redundancy version RV sequence, wherein an RV identity for last N transmission opportunities in the RV sequence is 0 or 3, and N is a positive integer; and
  decoding a retransmission position according to an RV identity order indicated by the RV sequence;
  wherein an RV identity for a last transmission opportunity in the RV sequence is 0 or 3; or
  RV identities for a first transmission opportunity and a last transmission opportunity in the RV sequence are 0 or 3; or
  an RV identity for a first transmission opportunity in the RV sequence is 0, and an RV identity for a last transmission opportunity in the RV sequence is 3; or
  an RV identity for a first transmission opportunity in the RV sequence is 3, and an RV identity for a last transmission opportunity in the RV sequence is 0;
  wherein an RV identity for each transmission opportunity other than the first transmission opportunity and the last transmission opportunity in the RV sequence is not 0 or 3;
  wherein the decoding the retransmission position according to the RV identity order indicated by the RV sequence comprises:
  decoding the retransmission position according to the RV identity order indicated by the RV sequence in a case that a quantity of retransmission positions is the same as a quantity of RV identities in the RV sequence; and
  decoding the retransmission position by repeatedly using the RV identity order indicated by the RV sequence in a case that a quantity of retransmission positions is greater than a quantity of RV identities in the RV sequence.

2. The method according to claim 1, wherein the receiving an RV sequence comprises:
  receiving the RV sequence by using a Radio Resource Control (RRC) message.

3. The method according to claim 1, wherein the decoding a retransmission position according to an RV identity order indicated by the RV sequence comprises:
  decoding a retransmission position according to an RV identity order indicated by the RV sequence when a semi-persistent scheduling SPS activation command or SPS deactivation command is received.

4. The method according to claim 1, wherein the decoding a retransmission position according to an RV identity order indicated by the RV sequence comprises:
  decoding a retransmission position according to an RV identity order indicated by the RV sequence when an RRC message is received, and the RRC message indicates a resource used for SPS.

5. A communications device, comprising: a processor, a memory, and a program that is stored in the memory and that can run on the processor, wherein the program, when executed by the processor, implements:
  receiving a redundancy version RV sequence, wherein an RV identity for last N transmission opportunities in the RV sequence is 0 or 3, and N is a positive integer; and
  decoding a retransmission position according to an RV identity order indicated by the RV sequence;
  wherein an RV identity for a last transmission opportunity in the RV sequence is 0 or 3; or
  RV identities for a first transmission opportunity and a last transmission opportunity in the RV sequence are 0 or 3; or
  an RV identity for a first transmission opportunity in the RV sequence is 0, and an RV identity for a last transmission opportunity in the RV sequence is 3; or
  an RV identity for a first transmission opportunity in the RV sequence is 3, and an RV identity for a last transmission opportunity in the RV sequence is 0;
  wherein an RV identity for each transmission opportunity other than the first transmission opportunity and the last transmission opportunity in the RV sequence is not 0 or 3;
  wherein the decoding the retransmission position according to the RV identity order indicated by the RV sequence comprises:
  decoding the retransmission position according to the RV identity order indicated by the RV sequence in a case that a quantity of retransmission positions is the same as a quantity of RV identities in the RV sequence; and
  decoding the retransmission position by repeatedly using the RV identity order indicated by the RV sequence in a case that a quantity of retransmission positions is greater than a quantity of RV identities in the RV sequence.

6. The communications device according to claim 5, wherein the receiving an RV sequence comprises:
   receiving the RV sequence by using a Radio Resource Control (RRC) message.

7. The communications device according to claim 5, wherein the decoding a retransmission position according to an RV identity order indicated by the RV sequence comprises:
   decoding a retransmission position according to an RV identity order indicated by the RV sequence when an RRC message is received, and the RRC message indicates a resource used for SPS.

8. A non-transitory computer-readable storage medium with a computer program stored thereon, wherein the computer program, when executed by a processor, implements:
   receiving a redundancy version RV sequence, wherein an RV identity for last N transmission opportunities in the RV sequence is 0 or 3, and N is a positive integer; and
   decoding a retransmission position according to an RV identity order indicated by the RV sequence;
   wherein an RV identity for a last transmission opportunity in the RV sequence is 0 or 3; or
   RV identities for a first transmission opportunity and a last transmission opportunity in the RV sequence are 0 or 3; or
   an RV identity for a first transmission opportunity in the RV sequence is 0, and an RV identity for a last transmission opportunity in the RV sequence is 3; or
   an RV identity for a first transmission opportunity in the RV sequence is 3, and an RV identity for a last transmission opportunity in the RV sequence is 0;
   wherein an RV identity for each transmission opportunity other than the first transmission opportunity and the last transmission opportunity in the RV sequence is not 0 or 3;
   wherein the decoding the retransmission position according to the RV identity order indicated by the RV sequence comprises:
   decoding the retransmission position according to the RV identity order indicated by the RV sequence in a case that a quantity of retransmission positions is the same as a quantity of RV identities in the RV sequence; and
   decoding the retransmission position by repeatedly using the RV identity order indicated by the RV sequence in a case that a quantity of retransmission positions is greater than a quantity of RV identities in the RV sequence.

9. The non-transitory computer-readable storage medium according to claim 8, wherein the receiving an RV sequence comprises:
   receiving the RV sequence by using a Radio Resource Control (RRC) message.

10. The non-transitory computer-readable storage medium according to claim 8, wherein the decoding a retransmission position according to an RV identity order indicated by the RV sequence comprises:
   decoding a retransmission position according to an RV identity order indicated by the RV sequence when an RRC message is received, and the RRC message indicates a resource used for SPS.

\* \* \* \* \*